US 12,484,567 B1

(12) United States Patent
Marsland

(10) Patent No.: US 12,484,567 B1
(45) Date of Patent: Dec. 2, 2025

(54) SYSTEM AND METHOD FOR ICE FISHING

(71) Applicant: Robert R. Marsland, Hampden, MA (US)

(72) Inventor: Robert R. Marsland, Hampden, MA (US)

(73) Assignee: MARSLAND INNOVISIONS LLC, Hampden, MA (US)

( * ) Notice: Subject to any disclaimer, the term of this patent is extended or adjusted under 35 U.S.C. 154(b) by 0 days.

(21) Appl. No.: 19/206,275

(22) Filed: May 13, 2025

(51) Int. Cl.
*A01K 97/12* (2006.01)
*A01K 97/01* (2006.01)

(52) U.S. Cl.
CPC .............. *A01K 97/12* (2013.01); *A01K 97/01* (2013.01)

(58) Field of Classification Search
CPC ........ A01K 97/12; A01K 97/01; A01K 97/00; A01K 89/0113; A01K 89/0162
USPC ...................................... 43/4.5, 16
See application file for complete search history.

(56) References Cited

U.S. PATENT DOCUMENTS

| | | | | |
|---|---|---|---|---|
| 2,032,537 A * | 3/1936 | Kozikowski | ......... | A01K 97/125 |
| | | | | 43/16 |
| 2,089,097 A * | 8/1937 | Millett | ................... | A01K 97/01 |
| | | | | 43/16 |
| 2,122,841 A * | 7/1938 | Laurila | ................... | A01K 97/01 |
| | | | | 43/16 |
| 2,195,356 A * | 3/1940 | Biddinger | .............. | A01K 97/01 |
| | | | | 43/17 |
| 2,335,752 A * | 11/1943 | Ralph | ................ | A01K 89/0184 |
| | | | | 242/255 |
| 2,448,346 A * | 8/1948 | Baugh | .................... | A01K 97/01 |
| | | | | 43/17 |
| 2,518,517 A * | 8/1950 | Baulski | .................. | A01K 97/01 |
| | | | | 43/16 |
| 2,565,379 A * | 8/1951 | Laurila | .................. | A01K 97/01 |
| | | | | 43/17 |
| 2,569,946 A * | 10/1951 | Olesen | ................... | A01K 97/01 |
| | | | | 43/17 |
| 2,651,875 A * | 9/1953 | Brockman | ............ | A01K 97/01 |
| | | | | 43/17 |
| 2,834,140 A * | 5/1958 | Knier | ..................... | A01K 97/01 |
| | | | | D22/148 |
| 2,908,100 A * | 10/1959 | Mogren | ................. | A01K 97/01 |
| | | | | 43/17 |
| 3,196,570 A * | 7/1965 | Borisch | .................. | A01K 97/01 |
| | | | | 43/17 |
| 3,230,655 A * | 1/1966 | Nomsen | ................. | A01K 97/01 |
| | | | | 43/17 |

(Continued)

FOREIGN PATENT DOCUMENTS

EP     3045041 A1 * 7/2016 ............. A01K 97/01

*Primary Examiner* — Timothy D Collins
*Assistant Examiner* — Maria E Graber
(74) *Attorney, Agent, or Firm* — Bulkley, Richardson and Gelinas, LLP; Mary R. Bonzagni, Esq.

(57) ABSTRACT

A system and method for ice fishing, which provides a more efficient and easier means for landing larger fish when attending multiple ice fishing holes, is provided. The inventive system is made up of one or more tip-up devices, each with a detachable spool, and a fishing rod with a retrieval reel assembly for receiving the spool from the one or more tip-up devices after a fish strike. Use of the inventive system obviates the need for using a hand-over-hand retrieval technique as well as the need for multiple fishing rods, when attending more than one ice fishing hole.

6 Claims, 5 Drawing Sheets

(56) References Cited

U.S. PATENT DOCUMENTS

| | | | | |
|---|---|---|---|---|
| 4,120,111 A * | 10/1978 | Young, Jr. | ............... | A01K 97/01 43/17 |
| 4,155,520 A * | 5/1979 | Klotz | ................ | A01K 89/01 74/435 |
| 4,567,686 A * | 2/1986 | Akom | ................ | A01K 97/01 43/17 |
| 4,821,446 A * | 4/1989 | Beaulieu, Jr. | .......... | A01K 97/02 43/17 |
| 4,830,306 A * | 5/1989 | Tsunoda | ................ | A01K 89/01 242/316 |
| 4,934,090 A * | 6/1990 | Storey | ................ | A01K 97/01 43/16 |
| 5,074,072 A * | 12/1991 | Serocki | ................ | A01K 97/01 43/16 |
| 5,163,243 A * | 11/1992 | Wold, Jr. | ............... | A01K 97/01 43/17 |
| 5,448,849 A * | 9/1995 | Burgett | ................ | A01K 97/01 43/17 |
| 5,488,796 A | 2/1996 | Taylor et al. | | |
| 5,615,840 A * | 4/1997 | Bushnell | ............. | A01K 89/058 242/301 |
| 6,158,160 A | 12/2000 | Sykes | | |
| 6,427,377 B1 * | 8/2002 | Kim | ................ | A01K 97/06 43/4.5 |
| 7,281,348 B2 * | 10/2007 | Allen, Jr. | ............... | A01K 97/01 43/4.5 |
| 7,677,487 B2 * | 3/2010 | Lee | ................ | A01K 89/033 242/246 |
| 8,308,097 B2 * | 11/2012 | Hyun | ................ | A01K 89/033 242/317 |
| 8,480,021 B1 * | 7/2013 | Sauk | ................ | A01K 89/01925 242/310 |
| 8,840,054 B2 * | 9/2014 | Maerz | ............. | A01K 89/01931 242/317 |
| 9,426,972 B2 * | 8/2016 | Nichols | ................ | A01K 97/12 |
| 9,439,409 B2 * | 9/2016 | Maerz | ............. | A01K 89/01931 |
| 9,949,470 B2 | 4/2018 | Paczesny | | |
| 9,974,294 B2 * | 5/2018 | Reiter | ................ | A01K 97/12 |
| 10,231,558 B1 * | 3/2019 | Suarez | ................ | A47F 7/005 |
| 11,622,877 B2 | 4/2023 | Davies | | |
| 2009/0272022 A1 * | 11/2009 | Grega | ................ | A01K 97/01 43/17 |
| 2011/0214331 A1 * | 9/2011 | O'Leary | ............... | A01K 97/11 43/16 |
| 2012/0055070 A1 * | 3/2012 | Maerz | ............. | A01K 89/01931 242/316 |
| 2012/0151818 A1 * | 6/2012 | Orth | ................ | A01K 97/11 43/4.5 |
| 2014/0047758 A1 * | 2/2014 | Ciciulla | ............ | A01K 99/00 43/21.2 |
| 2014/0215893 A1 | 8/2014 | Christianson et al. | | |
| 2016/0198689 A1 * | 7/2016 | Omura | ............. | A01K 89/01127 43/22 |
| 2024/0023531 A1 | 1/2024 | Larsen | | |

\* cited by examiner

SYSTEM AND METHOD FOR ICE FISHING

TECHNICAL FIELD

The present invention relates generally to a system and method for ice fishing. The inventive system includes one or more tip-up devices, each with a detachable spool, and a fishing rod with a retrieval reel assembly for receiving a detachable spool from the one or more tip-up devices after a fish strike. The inventive method relates generally to the use of this system.

BACKGROUND OF THE INVENTION

Ice fishing, which is a popular sport in the colder regions of the United States and Canada as well as other parts of the world, entails venturing onto an ice-covered body of water, drilling one or more holes through the ice, and then lowering a hooked and baited fishing line through the hole and into the water.

Oftentimes, a fisherman may drill several holes and place a spooled fishing line, having an accompanying tip-up device, in each hole. Tip-up devices, which are designed to work without a fishing rod, rest on the surface of the ice over the hole. The main body of the tip-up device usually comprises one or more cross-legs that sit flat on the ice, the legs having a span greater than the diameter of the hole to prevent the tip-up device from being pulled in. The tip-up device provides hands-free support for the spooled fishing line holding a baited hook or lure at depth and has an automatic signal flag that trips when a fish strikes, signaling to fishermen near the hole that a fish may be on the line. Once the fish has been hooked, the line is usually hauled in hand-over-hand until the fish is landed through the hole in the ice.

As will be really appreciated by those skilled in the art, as the fish size increases, the use of hand-over-hand retrieval techniques become increasingly difficult. In such circumstances, a jigging rod may be used.

Jigging rods are typically short, simple fishing rods held over an ice hole by a fisherman, with the line controlled by a simple reel. Fishermen will often use a jigging rod along with one or more tip-up devices over multiple other holes to increase the chances of success. This requires hand-over-hand retrieval over those fishing holes having a tip-up device regardless of the size of the fish.

Another technique used by ice fisherman is setting poles or rods in multiple holes to increase the probability of landing a fish. This, of course, negates the need for hand-over-hand retrieval, but does require the use of multiple poles.

A need exists for a more efficient and easier means for landing larger fish when attending multiple holes during ice fishing.

SUMMARY OF THE INVENTION

The present invention addresses this need by providing a system and method for attending multiple holes during ice fishing using only one fishing rod.

In particular, in an exemplary embodiment, the inventive system is made up of one or more tip-up devices, each with a detachable spool, and a fishing rod, wherein the fishing rod has a retrieval reel assembly for receiving a spool from the one or more tip-up devices after a fish strike.

The tip-up device has a spool shaft for receiving a detachable spool, which extends substantially perpendicularly therefrom, wherein the spool shaft has a locking groove or ring extending around a distal end thereof.

The fishing rod (e.g., jigging rod) has a retrieval reel assembly for receiving a spool from the one or more tip-up devices after a fish strike. The retrieval reel assembly has a spool drive hub, the hub having a plurality of members or studs extending radially therefrom, and a spool shaft extending substantially perpendicularly therefrom, the spool shaft having a locking groove or ring extending around a distal end thereof.

The detachable spool has a central barrel with a through hole around which a fishing line is wound, and two opposing flanges. A first flange has a notch for engaging with the spool drive hub, while the second flange has a catch-release mechanism attached thereto, which operates to releasably attach the spool to either the locking groove or ring of the spool shaft of the tip-up device, or to the locking groove or ring of the spool shaft of the spool drive hub of the retrieval reel assembly, and to release the spool when a lateral force is applied thereto.

In a preferred embodiment, the catch-release mechanism of the inventive spool is a ball-nose spring plunger.

The present invention also provides a method of ice fishing which, in an exemplary embodiment, uses a system including one or more tip-up devices, each with a detachable spool, and a fishing rod, wherein the fishing rod has a retrieval reel assembly for receiving the spool from the one or more tip-up devices after a fish strike, the method comprising:

a. positioning each tip-up device over an ice fishing hole while allowing a fishing line with baited hook or lure held by the detachable spool to enter the water; and upon receiving a signal of a fish strike from a tip-up device, b. removing the spool from the tip-up device and placing the spool onto a spool shaft of the retrieval reel assembly of the fishing rod; and then c. reeling the fish in, while pulling the line upwards until the fish clears the ice for retrieval; and d. repeating steps b-c each time a signal of a fish strike is received from the one or more tip-up devices.

Other features and advantages of the invention will be apparent to one of ordinary skill from the following detailed description. Unless otherwise defined, all technical and scientific terms used herein have the same meaning as commonly understood by one of ordinary skill in the art to which this invention belongs.

All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Matching reference numerals designate corresponding parts throughout the drawings, and components in the drawings are not necessarily to scale, emphasis instead being placed upon clearly illustrating the principles of the present disclosure.

While exemplary embodiments are disclosed in connection with the drawings, there is no intent to limit the present disclosure to the embodiment or embodiments disclosed herein. On the contrary, the intent is to cover all alternatives, modifications, and equivalents.

Figure 1A:
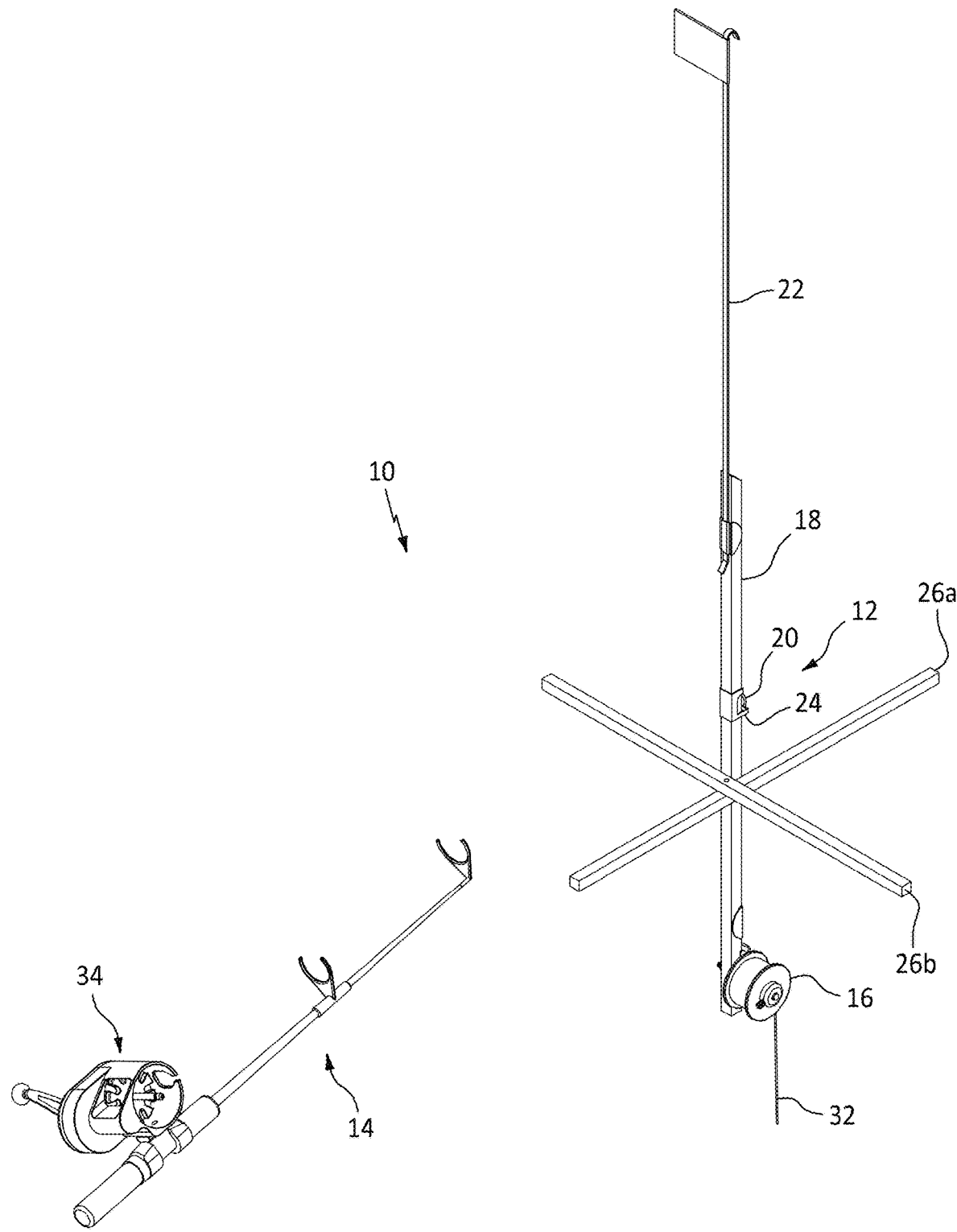
Figure 1B:
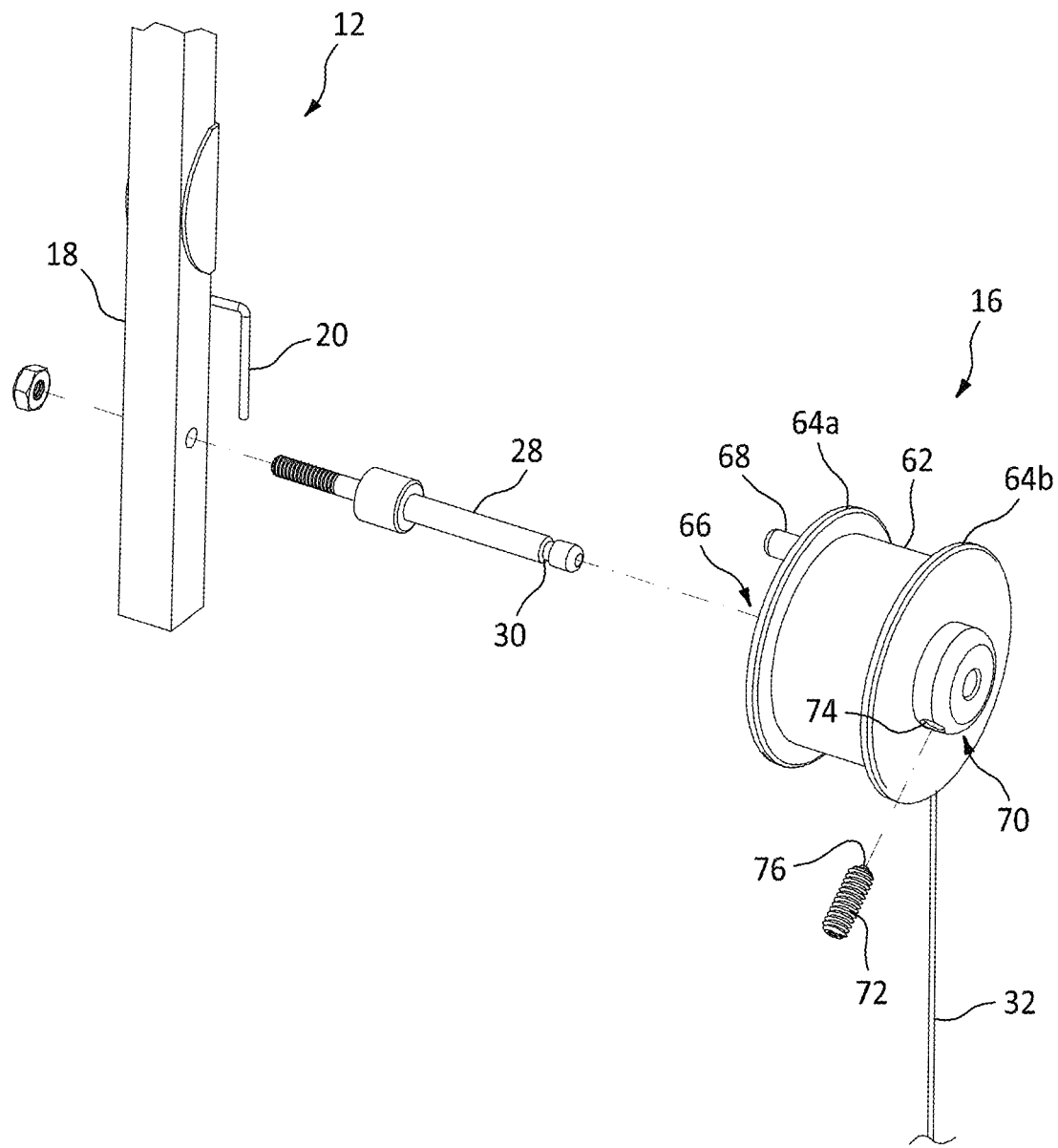
Figure 2:
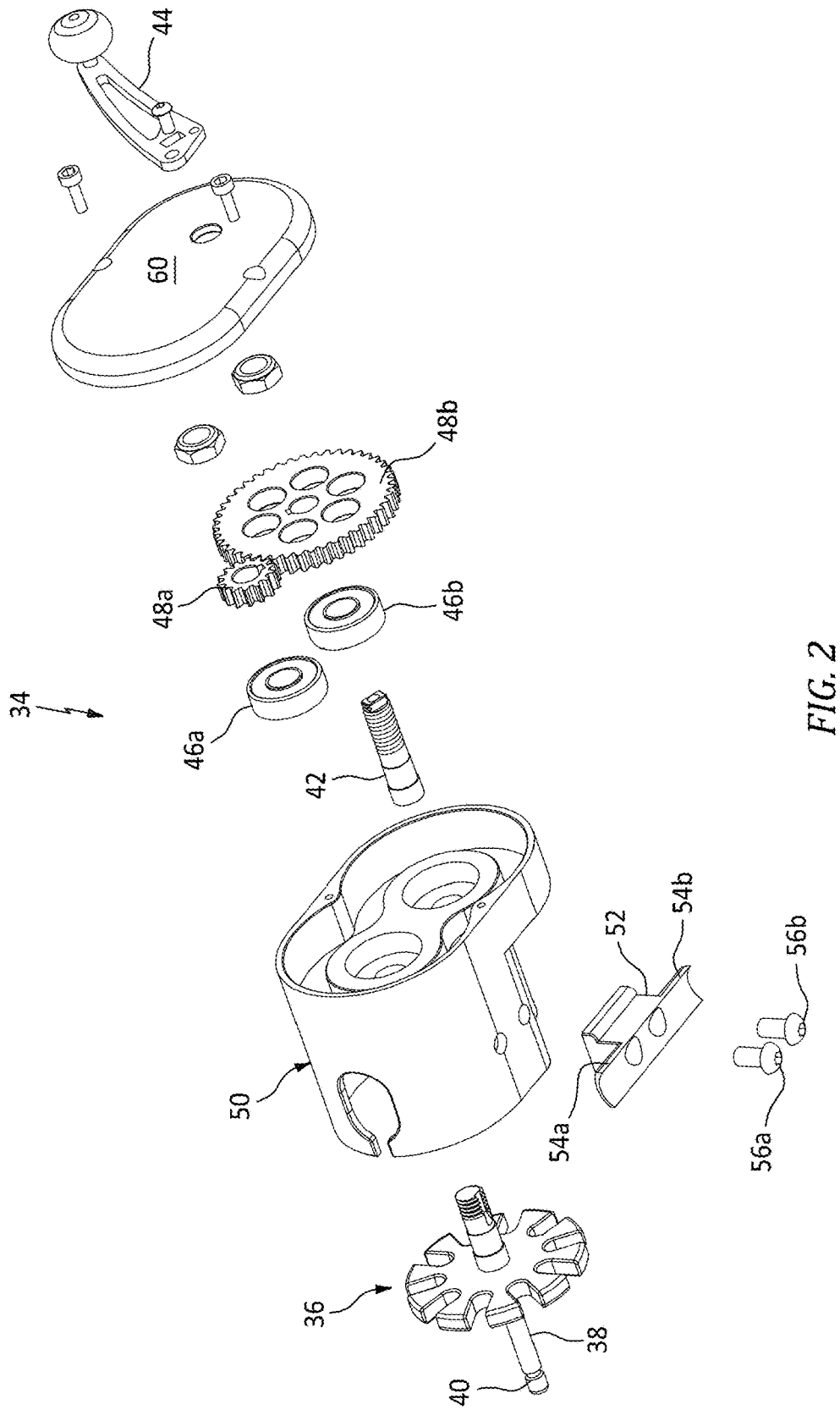
Figure 3:
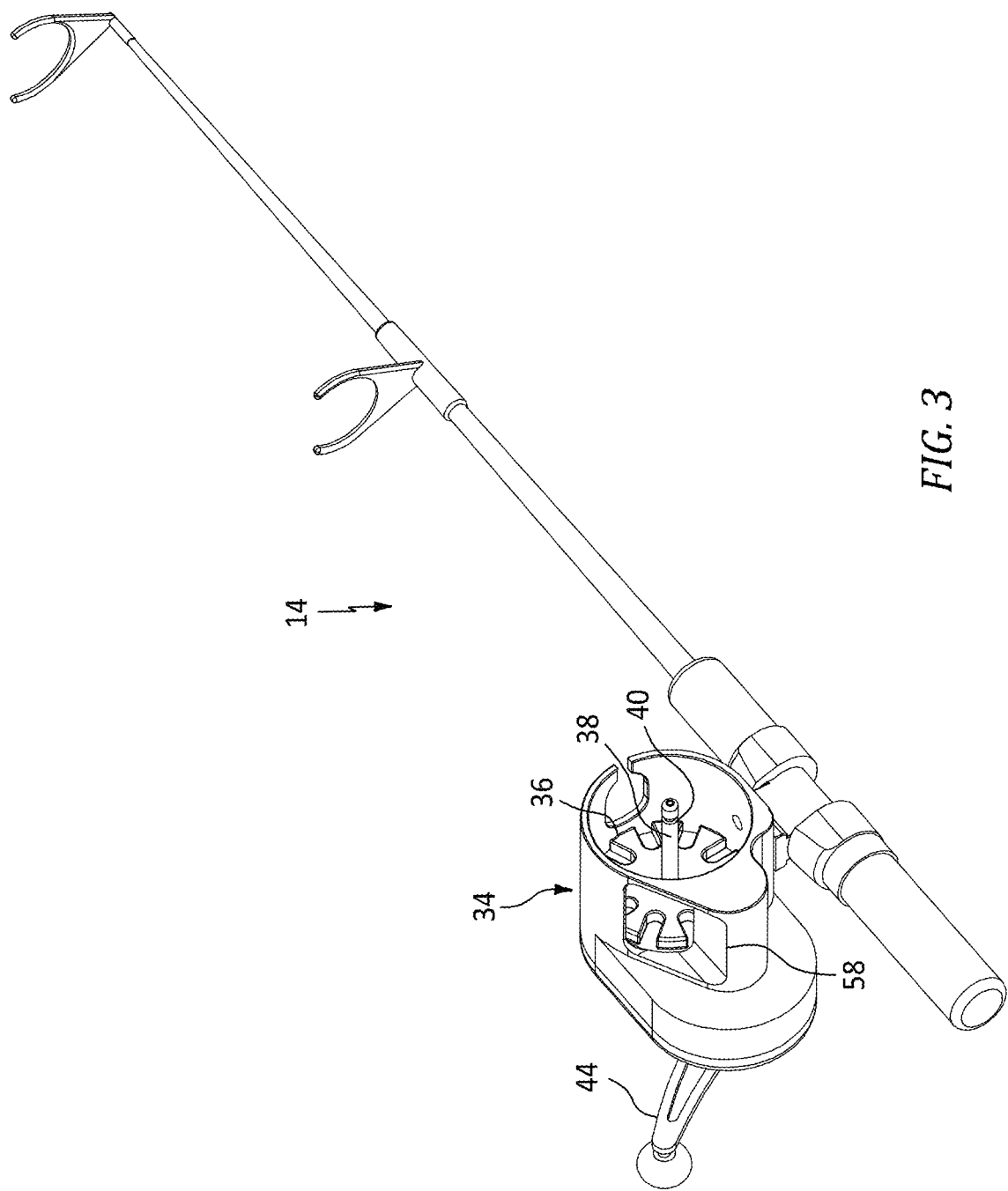
Figure 4C:
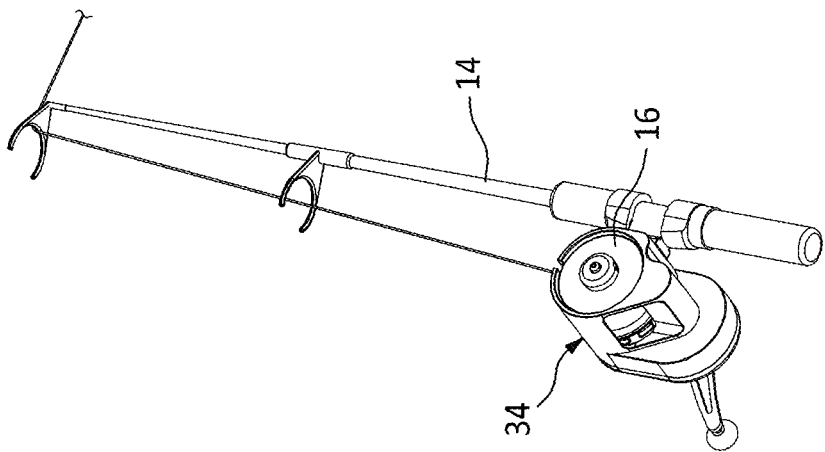
Figure 4B:
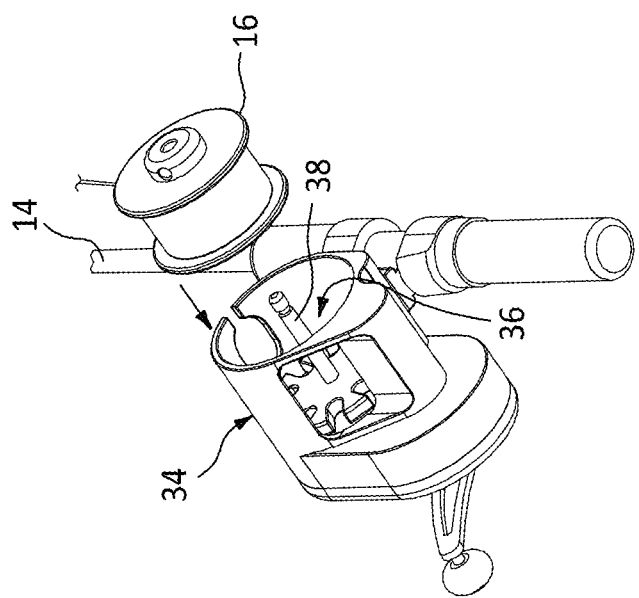
Figure 4A:
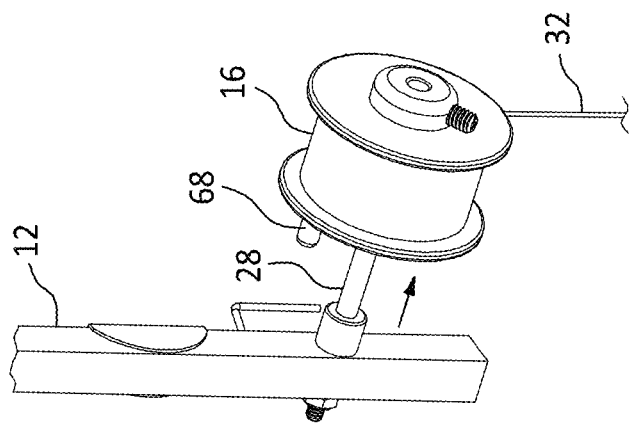

Particular features of the disclosed invention are illustrated by reference to the accompanying drawings in which:

FIG. 1A is a perspective view of an exemplary embodiment of the system for ice fishing of the present invention, while FIG. 1B is an exploded view of an exemplary embodiment of the tip-up device of the present invention with spool shaft as well as an exemplary embodiment of the detachable spool of the present invention;

FIG. 2 is an exploded view of an exemplary embodiment of the retrieval reel assembly of the present invention;

FIG. 3 is a perspective view of an exemplary embodiment of the fishing rod (in the form of a jigging rod) with retrieval reel assembly of the present invention; and FIGS. 4A, 4B, 4C denote steps of an exemplary embodiment of the method for ice fishing of the present invention.

DETAILED DESCRIPTION OF THE INVENTION

Referring now to the drawings in detail, reference numeral 10 has been used to denote an exemplary embodiment of the inventive system, which as best shown in FIG. 1A, includes one or more tip-up devices 12, each with a detachable spool 16, and a fishing rod 14 with a retrieval reel assembly 34. Exemplary embodiments of each such component of the inventive system will be described in more detail below.

Tip-Up Device

The tip-up device 12 rests on the surface of the ice over an ice fishing hole and provides hands-free support for the spool 16 that holds and releases fishing line with a baited hook or lure. The tip-up device 12 includes a base frame or main body 18, a trip mechanism (e.g., trip bar) 20, a spring-loaded flag or strike indicator assembly 22, and an engaging member 24. The engaging member 24 is disposed to engage the spring-loaded flag or strike indicator assembly 22 when it is in a downward facing "non-strike" indicating position. The "non-strike" indicating position is the position of assembly 22 prior to the occurrence of a fish strike. The signal flag or strike indicator assembly 22 trips or is released from engaging member 24 by movement of the trip bar 20, which is triggered by movement of the fishing line when a fish strikes, signaling to fishermen near the hole that a fish may be on the line. The base frame 18 of the tip-up device 12 has two cross legs 26a, 26b, that sit flat on the ice, the legs having a span greater than the diameter of the hole to prevent the tip-up device 12 from being pulled in. As best shown in FIG. 1B, a spool shaft 28 for receiving spool 16 extends substantially perpendicularly from the base frame 18. The spool shaft 28 has a locking groove or ring 30 extending around a distal end thereof. A length of fishing line 32 is wound around spool 16 with one end of the line attached to spool 16 and the other end holding the baited hook or lure.

The tip-up device 16 may be made using any suitable material including wood, metal, and/or plastic, while spool shaft 28 is preferably made from a stainless steel and/or aluminum alloy.

Fishing Rod with a Retrieval Reel Assembly

The fishing rod 14 of the present invention is preferably a jigging rod. As noted above, a jigging rod is typically a short, simple fishing rod held over an ice hole by a fisherman, with the line controlled by a simple reel. By way of the present invention, and as best shown in FIG. 3, this simple reel has been replaced by retrieval reel assembly 34, which serves to receive spool 16 from tip-up device 12 after a fish strike.

As best shown in FIG. 2, retrieval reel assembly 34, which facilitates retrieving fishing line 32 by winding it back onto spool 16, has a spool drive hub 36, the hub having a plurality of members or studs extending radially therefrom, and a spool shaft 38 extending substantially perpendicularly therefrom, the spool shaft 38 having a locking groove or ring 40 extending around a distal end thereof. Retrieval reel assembly 34 further includes a reel drive handle shaft or crankshaft 42 and handle 44. The crankshaft 42 is connected to both the spool drive hub 36 and the handle 44, and turning the handle rotates the crankshaft 42, which in turn, rotates the spool drive hub 36, which is engaged with the spool 16, making it spin and retrieve line 32. The crankshaft 42 utilizes ball bearings 46a, 46b, to reduce friction and ensure smooth rotation, as well as gears (i.e., a tooth driven gear 48a and a tooth driver gear 48b) for transmitting power and torque. The tooth driver gear 48b (i.e., the driver gear) on the crankshaft drives the tooth driven gear 48a (i.e., the driven gear), and the teeth on these gears mesh to transfer motion and power.

Reel housing 50 is fixably attached to a rod mount bracket 52 with side arms 54a, 54b, using button head hex drive screws 56a, 56b. The resulting assembly is then attached to the jigging rod 14 using a reel seat having attachment portions (e.g., tightening rings) (not shown). The side arms 54a, 54b, are slid underneath the tightening rings of the reel seat which are rotated to wedge the side arms 54a, 54b, between the rings and the rod, thereby mechanically attaching the assembly to the rod.

Reel housing 50 further includes a window 58, which as will be readily appreciated by those skilled in the art, allows for a fisherman to position his or her fingers directly on the spool 16 to provide extra drag and control, especially when retrieving larger fish. Reel housing 50 also includes a gear box cover 60.

Fishing rod 14 may be made using any material capable of providing the appropriate tension including, but not limited to, wood, split bamboo, or fiberglass. While the figures show a circular cross-section, many different cross-sectional shapes are contemplated for the rod including oval, tubular, and other shapes. The retrieval reel assembly 34 may also be made using any suitable material like aluminum, stainless steel, graphite, carbon fiber, and composite materials, with the gears preferably made of brass, aluminum, or stainless steel.

Detachable Spool

Referring now to FIG. 1B, spool 16 has a central barrel 62 around which a fishing line is wound, and two opposing flanges 64a, 64b. The central barrel 62 has a hollow tube 66 extending therethrough for receiving a spool shaft. Flange 64a has a notch 68 for engaging with a space between the radially extending members or studs of the spool drive hub 36 of the retrieval reel assembly 34, while flange 64b has a catch-release mechanism 70 attached thereto, which operates to releasably attach the spool 16 to either the spool shaft 28 of the tip-up device 12, or to the spool shaft 38 of the spool drive hub 36 of the retrieval reel assembly 34. The spool 16 is released by manually pulling the spool 16 laterally from either the spool shaft 28 of the tip-up device 12, or from the spool shaft 38 of the spool drive hub 36 of the retrieval reel assembly 34.

In a preferred embodiment, the catch-release mechanism 70 is a ball-nose spring plunger 72. The ball-nose spring plunger 72 is threaded into threaded hole 74 until ball 76 extends slightly beyond the threaded hole 74 into hollow tube 66. The spool shaft 28 is inserted through hollow tube 66 until the spool's locking groove or ring 40 is engaged by the ball 76 of the ball-nose spring plunger 72, thereby holding these items together. As indicated above, these items are released by pulling to release the connection. Upon release after a fish strike, spool 16 is transferred onto spool shaft 38 of the spool drive hub 36 of the retrieval reel assembly 34, where it is used in conjunction with rod 14 to retrieve the fish.

Spool 16 may assume a variety of sizes depending upon line capacity, and may be made from any suitable material, and preferably, due to weight considerations, is made using aluminum or graphite.

Method

The method of ice fishing of the present invention provides a more efficient and easier means for landing larger fish when attending multiple holes during ice fishing. As best shown in FIGS. 4A-4C, in an exemplary embodiment, the inventive method includes the steps of:

(a) inserting a spool 16 onto the spool shaft 28 of each tip-up device 12;

(b) positioning each tip-up device 12 over an ice fishing hole while allowing the fishing line 32 with a baited hook or lure to enter the water; upon receiving a signal of a fish strike from a tip-up device 12, (c) removing the spool 16 from the spool shaft 28 of the tip-up device 12 (see FIG. 4A) and placing the spool 16 onto the spool shaft 38 of the spool drive hub 36 of the retrieval reel assembly 34 of the fishing rod 14 (see FIGS. 4B and 4B); and (d) setting the hook or lure and then reeling the fish in, while pulling the line upwards until the fish clears the ice for retrieval;

(e) repeating steps c-d each time a signal of a fish strike is received from a tip-up device.

As will be readily apparent to those skilled in the art, since fish metabolism and thus fish movement slows down in cold weather, ample time is provided to remove the spool 16 from the tip-up device 12 and to place the spool 16 in the retrieval reel assembly 34 of the fishing rod 14.

The inventive method may be repeated using fishing rod 14 for each tip-up device in use that signals a fish strike, thereby obviating the need for the use of hand-over-hand retrieval techniques as well as the use of multiple fishing rods.

Although exemplary embodiments have been shown and described, it will be clear to those of ordinary skill in the art that a number of changes, modifications, or alterations to the invention as described can be made. All such changes, modifications, and alternations should therefore be seen as within the scope of the disclosure.

I claim:

1. A system for ice fishing comprising: one or more tip-up devices that each have a spool shaft that holds a detachable spool, and a fishing rod remote from the one or more tip-up devices, wherein the fishing rod has a retrieval reel assembly with a spool drive hub having a spool shaft for receiving the detachable spool from one of the one or more tip-up devices after a fish strike, wherein, each spool shaft has a discrete, circular locking groove or ring extending around a distal end thereof, wherein, the detachable spool has two flanges on opposing sides of a central barrel, one flange having a catch-release mechanism attached thereto, which operates to releasably attach the detachable spool to the locking groove or ring of a spool shaft of one of the one or more tip-up devices before a fish strike, and to the locking groove or ring of the spool shaft of the spool drive hub of the retrieval reel assembly of the fishing rod after a fish strike, and to release the detachable spool when a lateral force is applied thereto.

2. The system of claim 1, wherein the fishing rod is a jigging rod.

3. The system of claim 1, wherein the catch-release mechanism of the detachable spool is a ball-nose spring plunger having a ball at a distal end thereof, wherein the ball engages a spool shaft's locking groove or ring thereby holding these items together.

4. The system of claim 1, wherein the spool drive hub has a plurality of members or studs extending radially therefrom, and wherein the spool shaft extends substantially perpendicularly therefrom.

5. The system of claim 4, wherein one flange of the detachable spool has a notch for engaging with the spool drive hub, while the other flange has the catch-release mechanism attached thereto.

6. The system of claim 5, wherein the catch-release mechanism is a ball-nose spring plunger.

* * * * *